July 27, 1954
S. BIRKLAND ET AL
MACHINE FOR WEIGHING, FILLING, AND
SEALING PRODUCTS INTO CONTAINERS
Filed May 8, 1951

2,684,803

INVENTORS.
STELLAN BIRKLAND
MALCOLM W. LOVELAND
BY Charles H. Erne
Ivan D. Thornburgh
ATTORNEYS

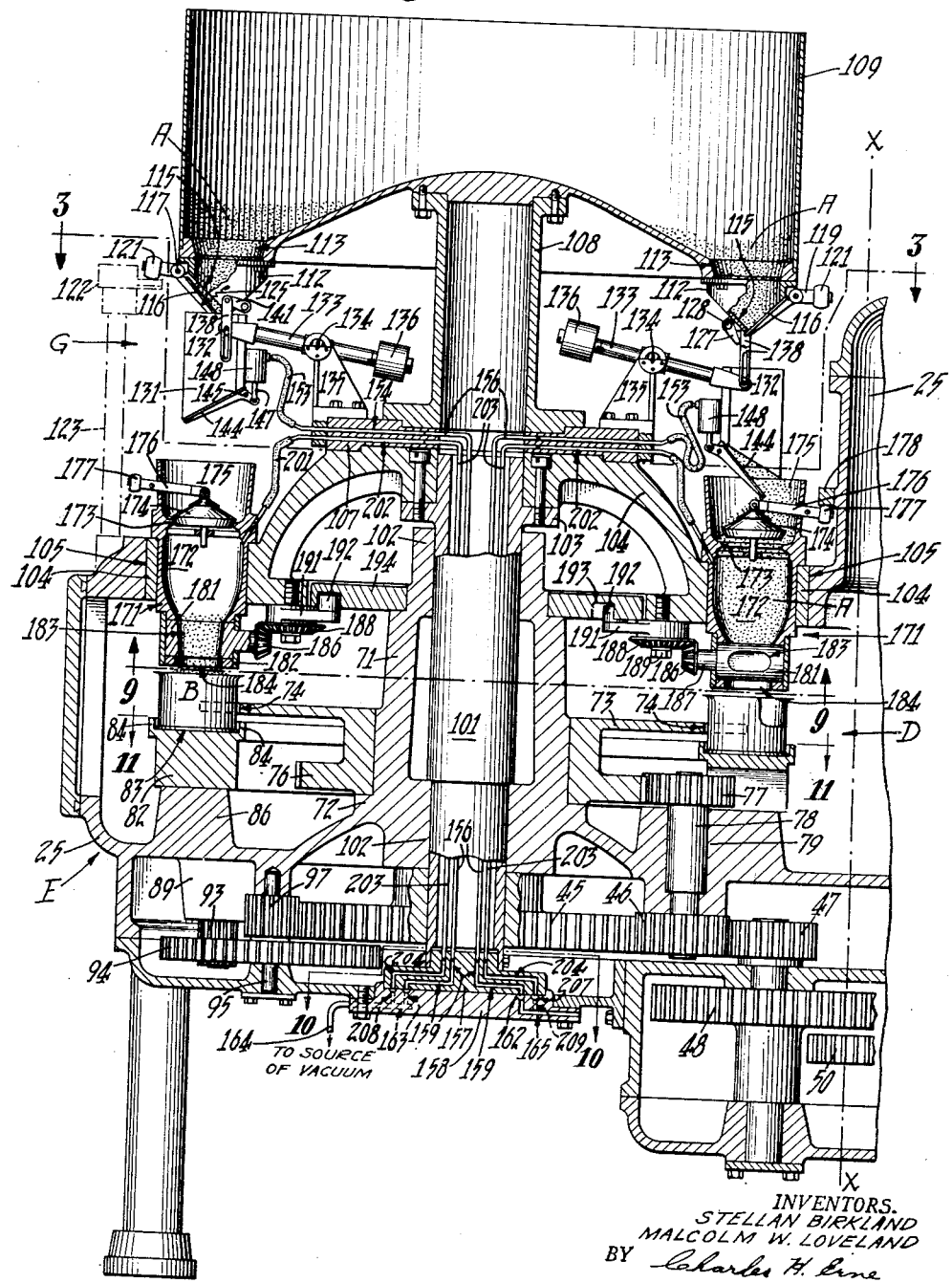

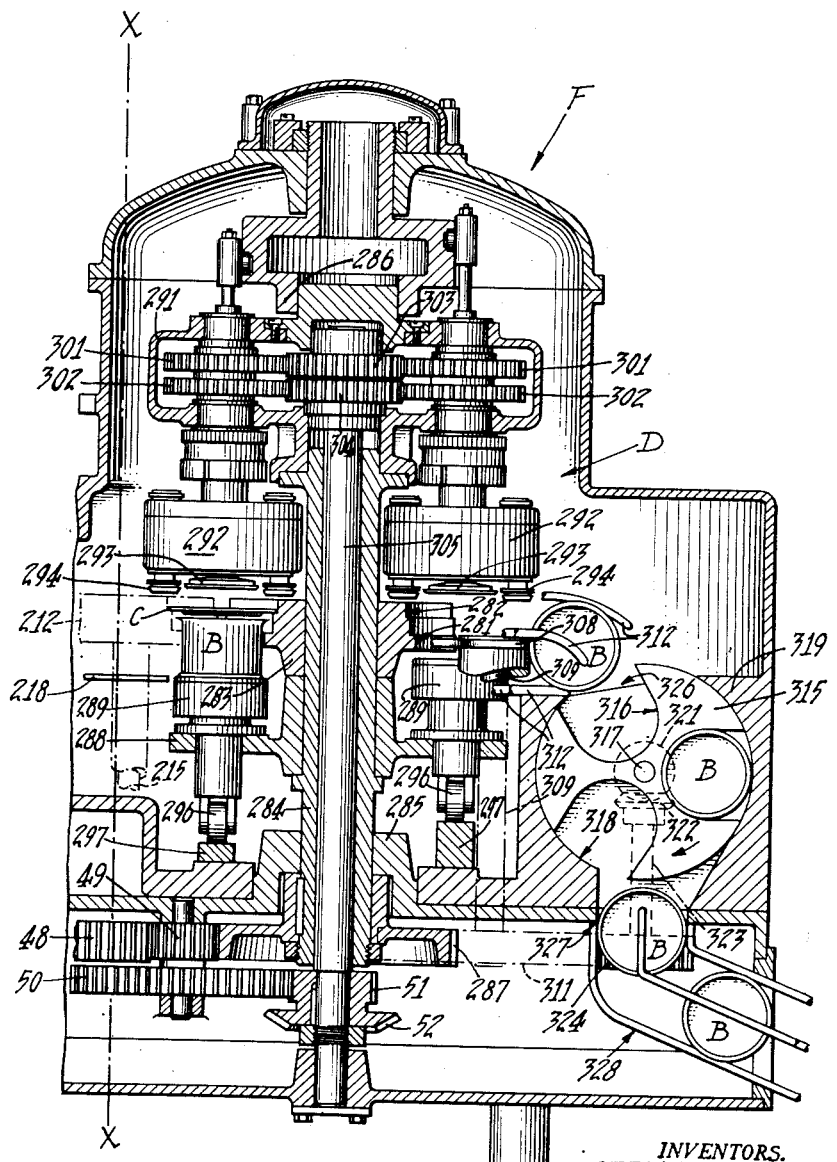

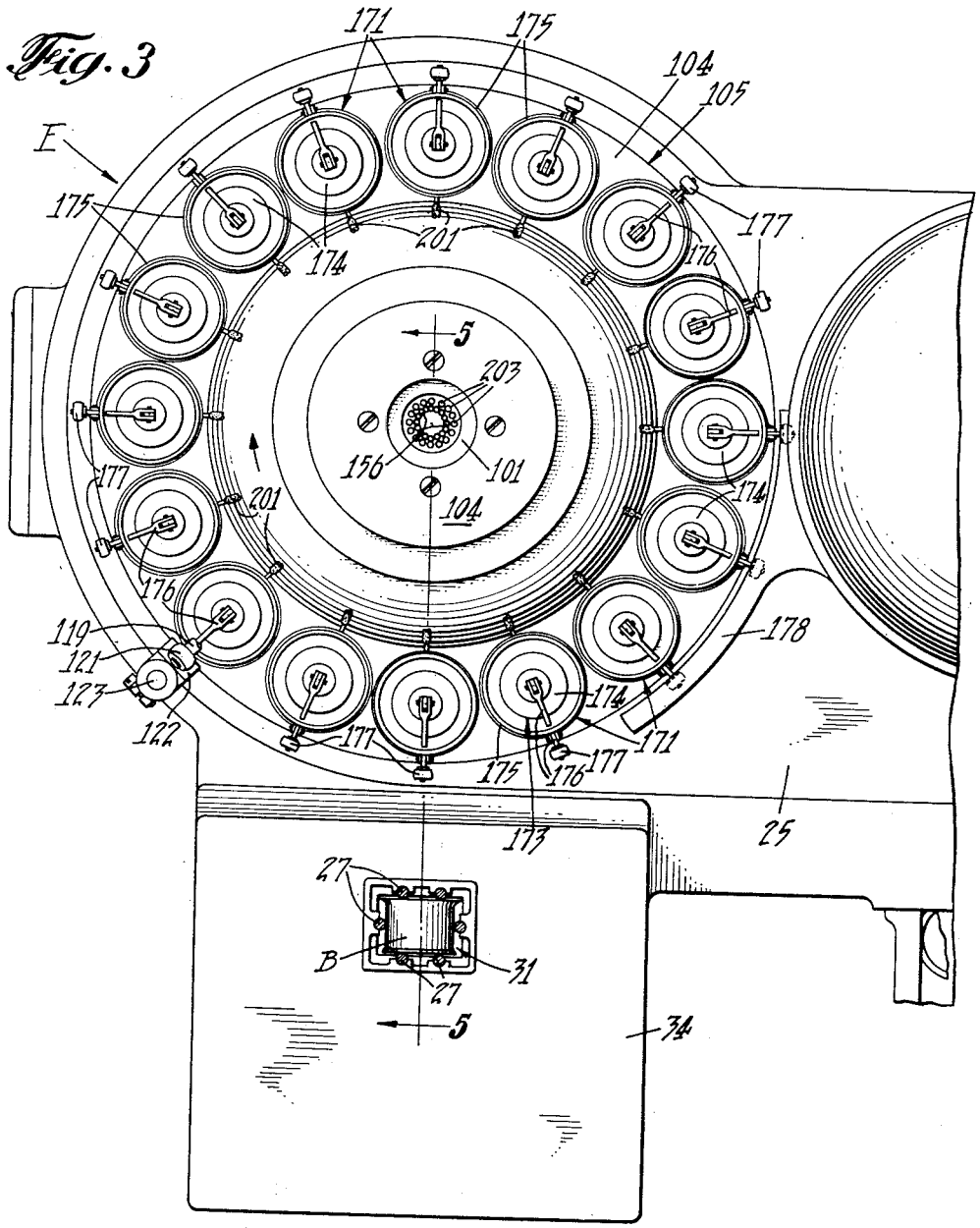

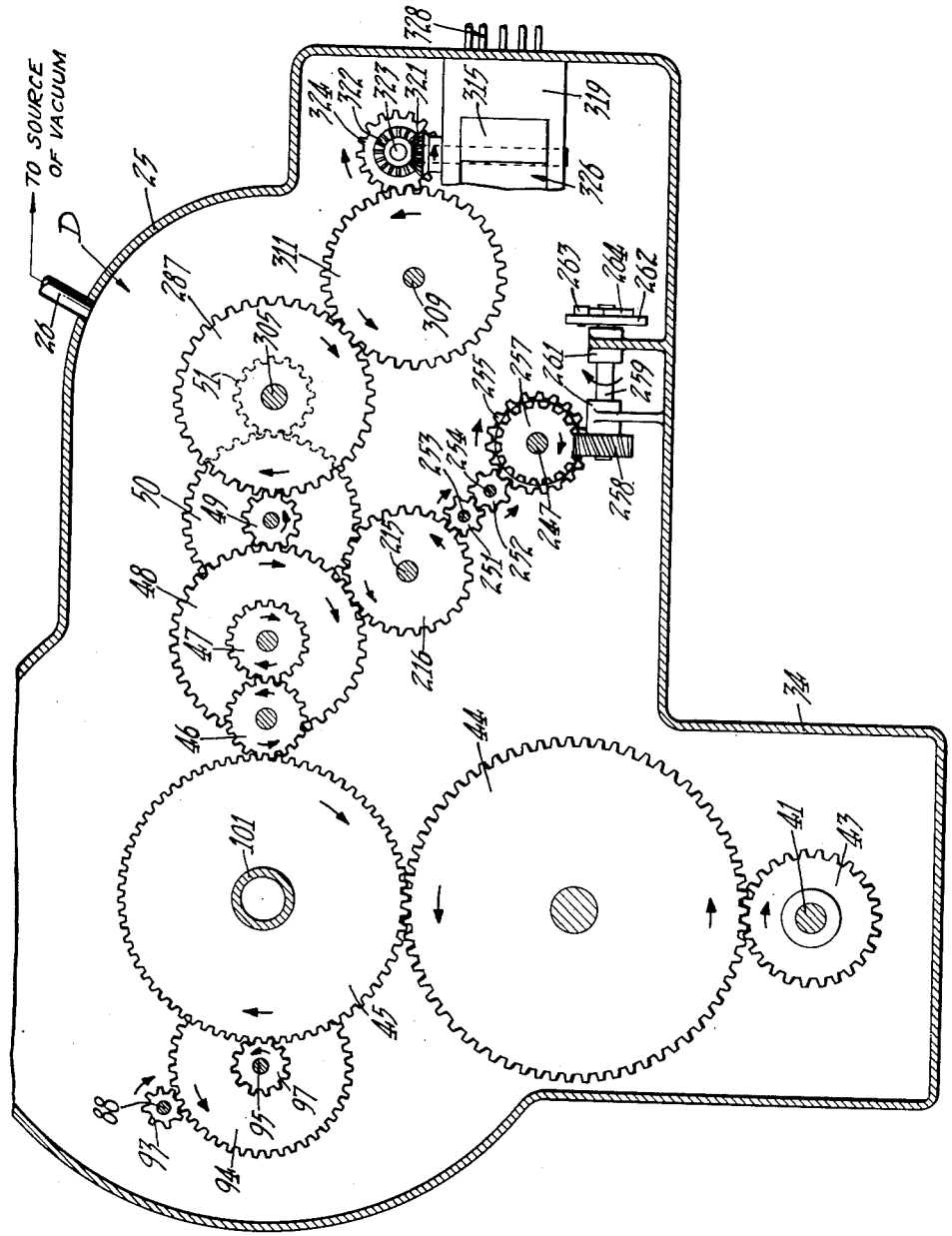

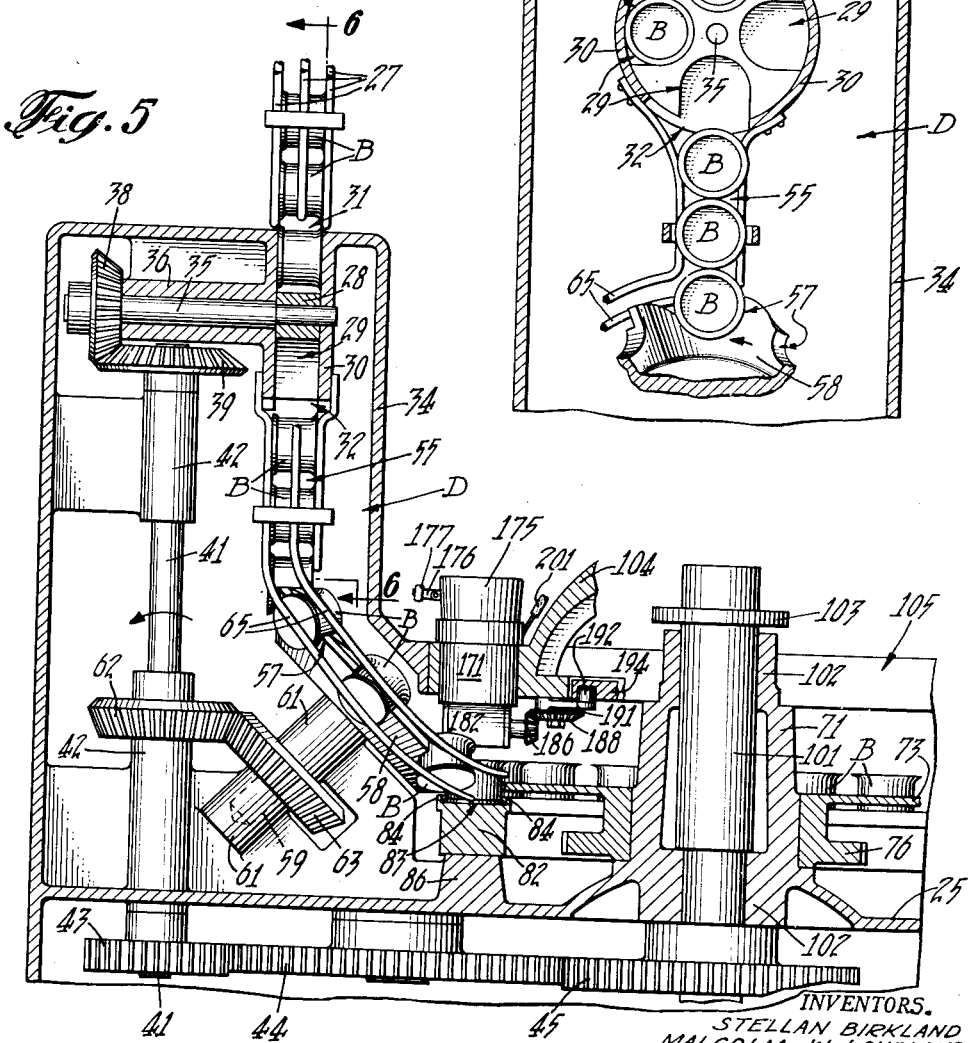

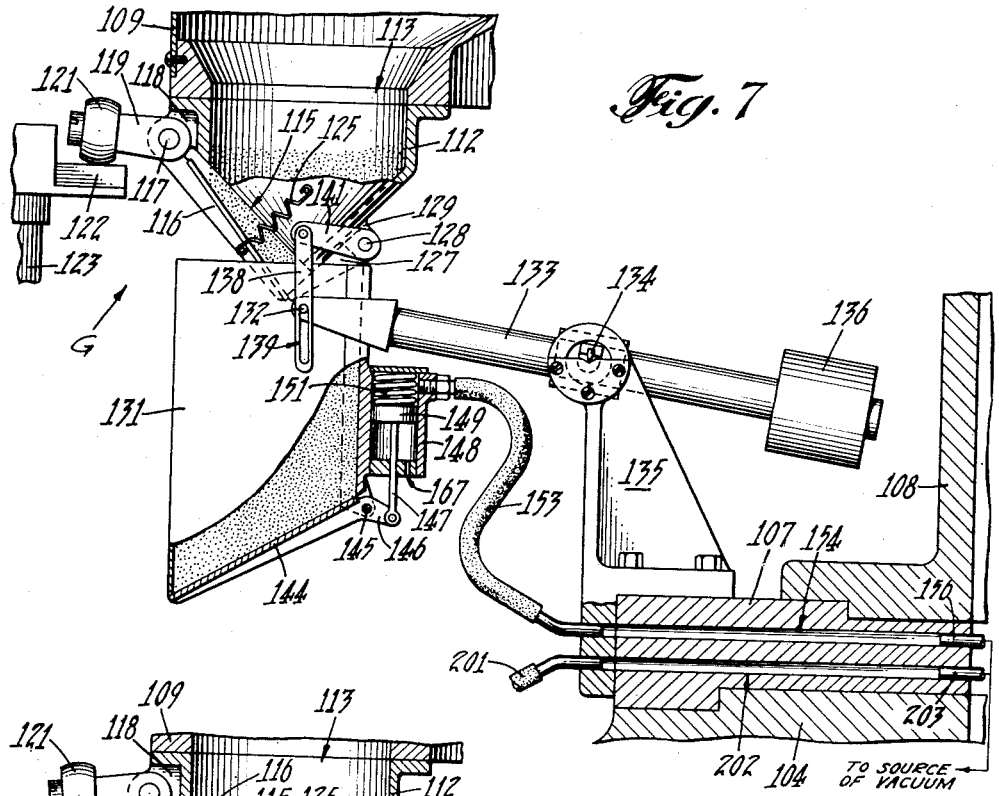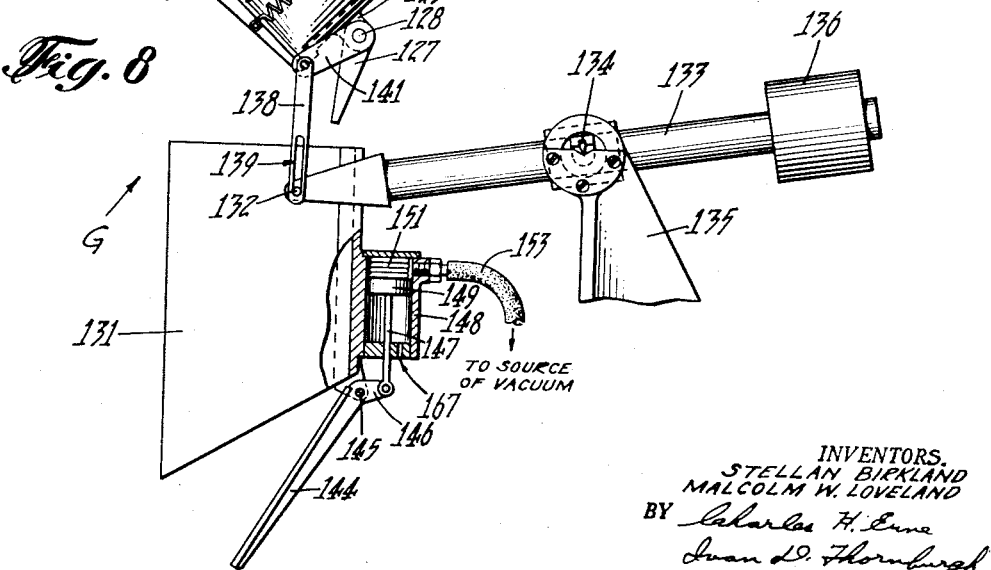

July 27, 1954

S. BIRKLAND ET AL 2,684,803

MACHINE FOR WEIGHING, FILLING, AND
SEALING PRODUCTS INTO CONTAINERS

Filed May 8, 1951

INVENTORS.
STELLAN BIRKLAND
MALCOLM W. LOVELAND
BY
ATTORNEYS

July 27, 1954
S. BIRKLAND ET AL
2,684,803
MACHINE FOR WEIGHING, FILLING, AND
SEALING PRODUCTS INTO CONTAINERS
Filed May 8, 1951
10 Sheets-Sheet 9
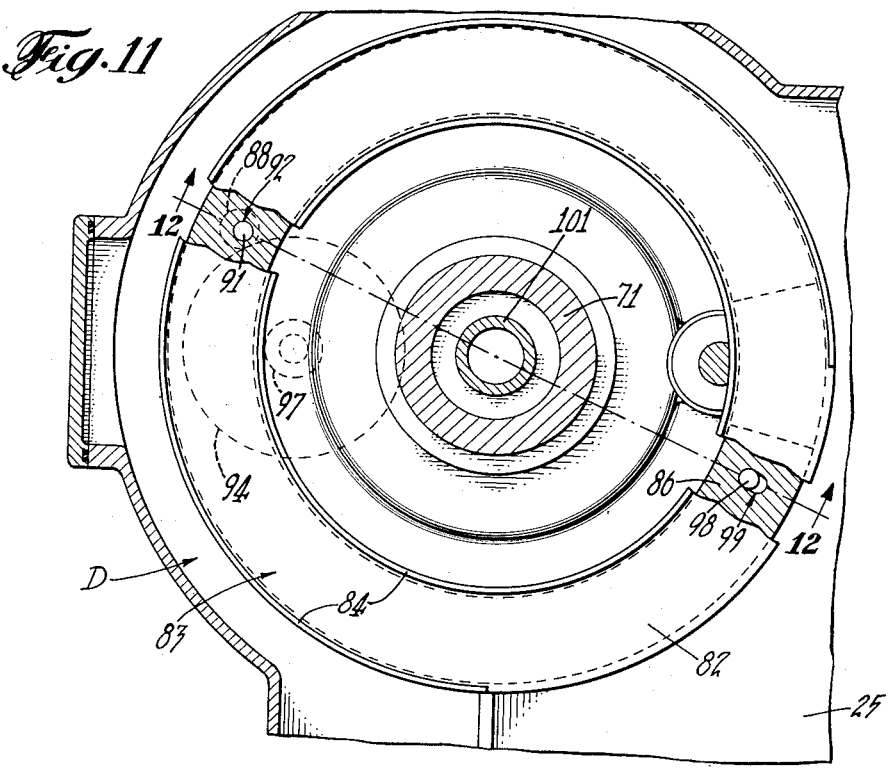
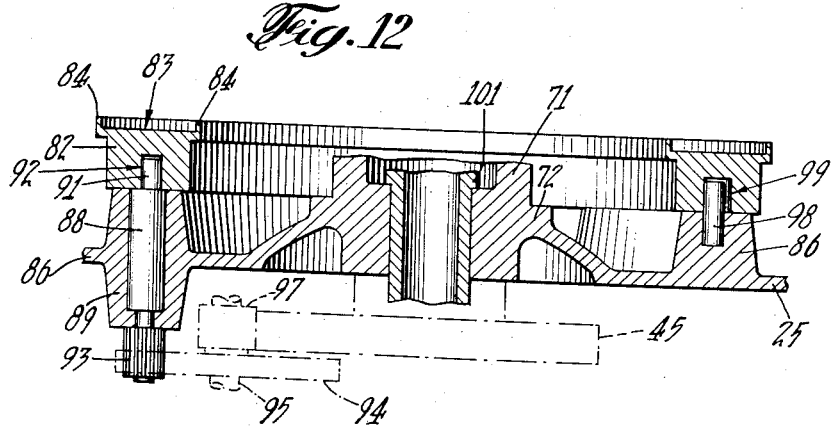
INVENTORS.
STELLAN BIRKLAND
MALCOLM W. LOVELAND
BY Charles H. Erne
Ivan D. Thornburgh
ATTORNEYS Patented July 27, 1954

2,684,803

UNITED STATES PATENT OFFICE 2,684,803

MACHINE FOR WEIGHING, FILLING, AND SEALING PRODUCTS INTO CONTAINERS

Stellan Birkland, San Francisco, and Malcolm W. Loveland, Orinda, Calif., assignors to American Can Company, New York, N. Y., a corporation of New Jersey Application May 8, 1951, Serial No. 225,086

9 Claims. (Cl. 226—72)

The present invention relates to machines for weighing, filling and sealing granular products such as coffee or the like into cans or containers and has particular reference to devices for weighing and prevacuumizing a charge of the product of a weight predetermined by the capacity of a container and for filling the vacuumized charge into a can or container.

This is a companion application to co-pending United States applications Serial No. 225,084, filed May 8, 1951, by Stellan Birkland on Weighing and Filling Machine, and Serial No. 225,085 filed May 8, 1951, by Stellan Birkland on Transfer Device for Pressurized Compartment.

An object of the invention is the provision in a filling and sealing machine, of devices wherein a granular product may be measured out into charges of a weight predetermined by the capacity of the cans and the charges filled into cans, the weighing and the filling being effected as the cans are passing through the machine in a substantially continuous procession so that continuous and smooth operation of the machine may be had for most efficient results.

Another object is the provision in such a machine of devices wherein each charge of the product after weighing is prevacuumized before filling into its can so as to increase the efficiency of vacuum filling machines in which the cans are prevacuumized before filling.

Another object is the provision of such a machine wherein the product filling heads are located in a rotatable carrier member operating in a seat surrounding an opening in a vacuum chamber so that the product can be weighed outside the machine and introduced into the vacuum chamber through the heads as the heads rotate with the carrier member.

Another object is the provision in such a machine of a shaker table for shaking the product down into compact form in the cans as they advance through the machine, wherein the table is given an eccentric motion to effect proper shaking of the advancing cans.

Another object is the provision in such a machine of novel devices for continuously introducing the cans, the covers, and the weighed charges of the product into a vacuum chamber in the machine and for continuously discharging the sealed cans from the chamber without impairing the vacuum continuously maintained in the vacuum chamber.

Numerous other objects and advantages of the invention will be apparent as it is better understood from the following description, which, taken in connection with the accompanying drawings, discloses a preferred embodiment thereof.

Referring to the drawings:

Figs. 2a and 2b are enlarged sectional views which when taken together and abutted along the vertical lines X—X present a longitudinal view of the machine as taken substantially along the broken line 2—2 in Fig. 1;

Fig. 3 is a plan view taken substantially along the broken line 3—3 in Fig. 2a, with parts broken away;

Fig. 4 is a schematic plan view of the various gear trains shown at the lower portions of the views disclosed in Figs. 2a and 2b;

Fig. 5 is a slightly reduced scale sectional view taken substantially along the line 5—5 in Fig. 3, with parts broken away;

Fig. 6 is a sectional view taken substantially along the broken line 6—6 in Fig. 5, with parts broken away;

Figs. 7 and 8 are enlarged detail views of product weighing devices shown at the upper left in Fig. 2a, the views illustrating certain of the movable parts in different positions;

Fig. 10 is an enlarged plan view taken substantially along the broken line 10—10 in Fig. 2a;

Fig. 11 is a plan view taken substantially along the line 11—11 in Fig. 2a, with parts broken away;

Fig. 12 is a sectional view taken substantially along the line 12—12 in Fig. 11;

Figure 1:
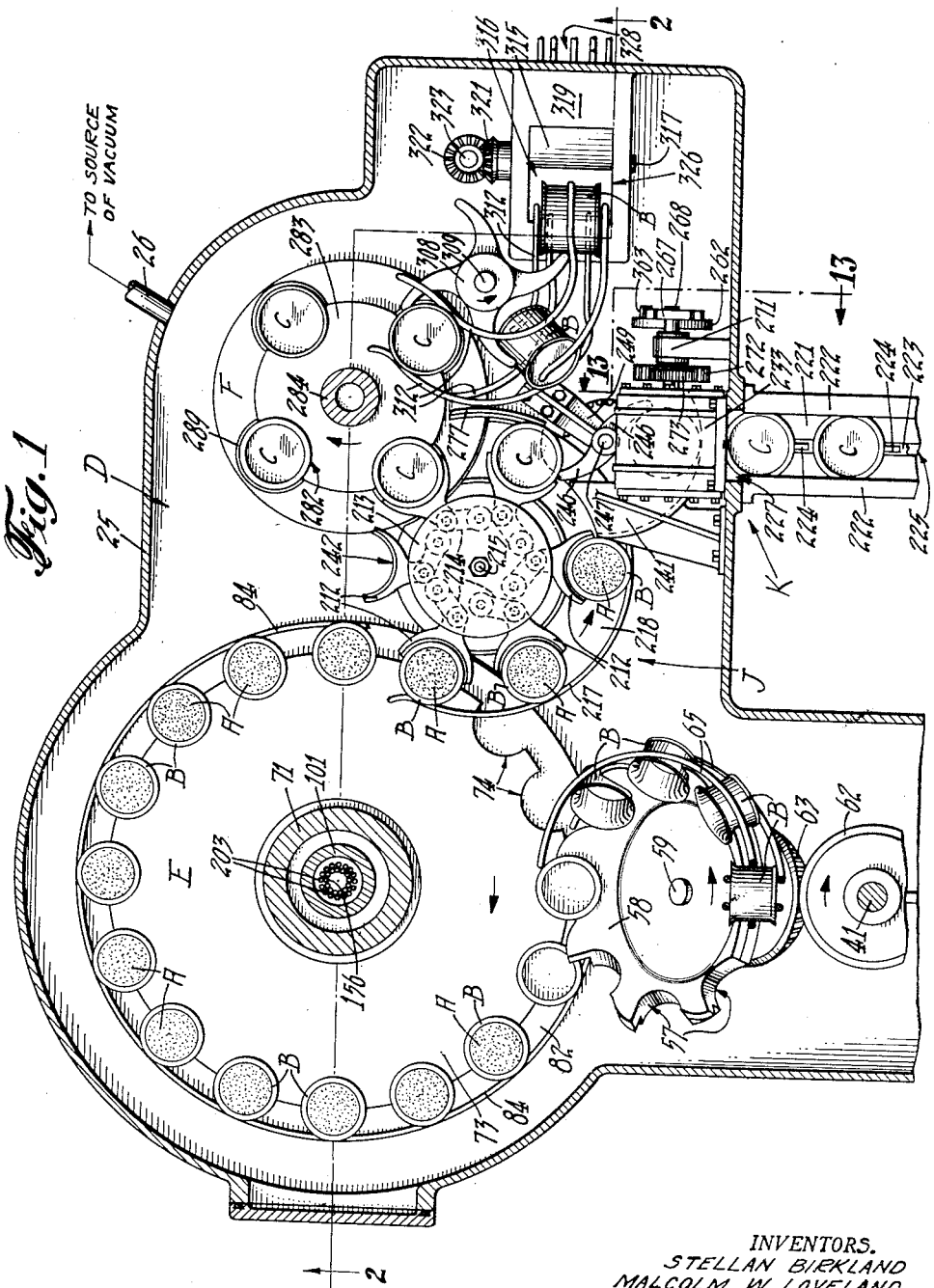
Figure 1 is a sectional plan view of a machine embodying the instant invention, with parts broken away.

As a preferred or exemplary embodiment of the instant invention the drawings illustrate a machine for filling weighed charges of a granular product A (Fig. 1) such as coffee or the like into vacuumized cans or containers B and sealing the filled cans under vacuum with covers C. In such a machine the cans B and covers C, moving in a substantially continuous procession, are introduced into a vacuum overall chamber D which contains a rotary filling mechanism E and a rotary closing mechanism F. By virtue of their introduction into the vacuum chamber D the cans B and covers C are exhausted of any trapped air and are thus made ready for the reception of the weighed charges of the product A.

The product A to be filled into the cans B is weighed out into individual charges of a weight, predetermined by the capacity of a can, outside of the vacuum chamber D. Each charge of the product is separately prevacuumized after weighing to remove any trapped air and is then introduced into the vacuum chamber and filled into a can and sealed ready for shipment or storage.

The vacuum chamber D forms a major portion of the machine and is enclosed by a housing 25 (Fig. 1) which also serves as and constitutes the main frame of the machine. The interior of this housing 25 which constitutes the vacuum chamber D is exhausted of air and is maintained at a predetermined vacuum by way of a vacuum pipe 26 which leads to any suitable source of vacuum.

The empty cans B disposed on their sides and rolling in a substantially continuous procession along a runway 27 (Figs. 3, 5 and 6) enter the vacuum chamber D through a rotary inlet valve 28 having a plurality of spaced can receiving pockets 29. The inlet valve 28 rotates in a cylindrical valve seat 30 having a can inlet opening 31 and an outlet opening 32. The seat is formed in an offset portion 34 of the vacuum chamber housing 25. The valve 28 is mounted on a horizontally disposed shaft 35 journaled in a bearing 36 formed in the portion 34 of the housing 25.

Rotation of the inlet valve 28 is effected continuously through a bevel gear 38 which is carried on the valve shaft 35. The gear 38 meshes with a similar bevel gear 39 carried on the upper end of a vertical drive shaft 41 journaled in a pair of spaced bearings 42 formed in the offset portion 34 of the housing 25. The lower end of the drive shaft 41 extends through the bottom of the housing 25 and carries a driving gear 43 which is continuously rotated through a long gear train disposed below the main housing 25 and extending back to a main driving gear associated with the closing mechanism F. This gear train includes an idler gear 44 (Fig. 4) which meshes with the gear 43, a filler drive gear 45 (Figs. 4 and 2a), a pair of pinions 46, 47, a gear 48, a pinion 49 (Figs. 4 and 2b), a gear 50, and a pinion 51 (Figs. 4 and 2b) which is formed as an integral part of a main driving bevel gear 52 which is driven in any suitable manner.

Hence through this continuously connected and operating gear train, the can inlet valve 28 is continuously rotated within its seat 30 in a counterclockwise direction as viewed in Fig. 6 and thus keeps the vacuum chamber D sealed against the entrance of outside air except the negligible quantity that enters with incoming cans. By virtue of this rotation of the valve 28, each valve pocket 29 as it approaches the inlet opening 31 in the housing 25, receives a can B from the runway 27 and carries it through substantially 180° into the vacuum chamber D.

Within the chamber D the entered can falls from the pocket 29 of the inlet valve and is received in a vertical runway 55 (Figs. 5 and 6) comprising spaced and parallel guide rails supported by attachment to the valve seat 30. The runway 55 guides the still horizontally disposed cans B into spaced pockets 57 of a bevel transfer turret 58 (see also Fig. 1) disposed at an angle of 45° with its outer pocketed periphery adjacent the lower or discharge end of the runway 55.

The bevel turret 58 is mounted on a drive shaft 59 which is journaled in a pair of spaced bearings 61 formed within and as an integral part of the housing 25. The shaft 59 is disposed at an angle of 45° relative to the drive shaft 41 and is continuously rotated from the shaft 41 through the medium of a bevel gear 62 carried on the shaft and meshing with a bevel gear 63 carried on the turret shaft 59 between the bearings 61.

The continuously rotating bevel transfer turret 58 carries each pocketed can B through an arc of substantially 180° and in so doing turns the cans from their originally received horizontal position into a vertical position with their open ends upwardly for filling and subsequent closing. Curved guide rails 65, forming continuations of the runway 55, follow the outer contour of the bevel transfer turret 58 and hold the received cans B in their turret pockets 57 during their travel with the transfer turret. By virtue of their travel with the transfer turret 58 within the vacuum chamber D, the empty incoming cans B are freed or exhausted of any air that may still be trapped within them. The transfer turret 58 places the empty vacuumized cans in the filling mechanism E.

The filling mechanism E (Fig. 2a) is a rotatable structure, partially located within the vacuum chamber D and is supported principally upon a stationary vertical cylindrical column 71 which extends up from the bottom of the housing 25. The lower portion of the column 71 is formed with a shoulder 72 which supports a horizontally disposed rotatable filling turret 73 (see also Fig. 1) having a plurality of can pockets 74 spaced around its outer periphery. The outer periphery of the filling turret 73 is adjacent and substantially tangent to the outer periphery of the bevel transfer turret 58. It is these pockets 74 that receive the empty cans B in upright filling position from the bevel transfer turret 58 as mentioned above. For this latter purpose the filling turret 73 is continuously rotated in time with the bevel transfer turret 58 through a spur gear 76 (Fig. 2a) which is formed integrally with and located immediately below the filling turret. The gear 76 meshes with and is driven by a pinion 77 mounted on a short vertical shaft 78 journaled in a bearing 79 formed in the bottom of the housing 25. The shaft extends below the housing 25 and carries the pinion 46 which is a part of the driving gear train hereinbefore mentioned.

As an empty vacuumized can B is transferred from the bevel transfer turret 58 to the filling turret 73 it leaves the guide rails 65 and rides onto and along a vibrator or shaker table 82 (Figs. 1, 2a, 11 and 12) which is provided to vibrate the cans during the filling operation to insure proper settling of the product into the cans so that the product does not extend above the top of the cans where it would interfere with the covers C when the latter are applied and sealed in place. The table 82 preferably is formed in the shape of a ring or annulus and its flat top surface is formed with a wide groove 83 defined by a pair of spaced and concentric vertical shoulders or guide rails 84 providing a shallow horizontal circular runway for confining and guiding the cans B as they are propelled along the table by the filling turret 73. A portion of the outer guide rail 84 is cut away as best shown in Fig. 11 to permit of receiving and discharging the cans from the table.

The bottom face of the annular table 82 is flat and rests upon an annular support 86 which extends up from the bottom of the main housing 25. The ring table 82 is rapidly slid or vibrated in a horizontal direction and with an eccentric motion on the support 86 through a vertical, rotatable vibrator shaft 88 (Figs. 11 and 12) carried in a bearing 89 formed on the support 86. The upper end of the vibrator shaft 88 is formed with a vibrator pin 91 which is located in an eccentric position relative to the axis of the shaft. This pin 91 extends into a bearing 92 formed in the table.

The lower end of the shaft 88 carries a pinion 93 which meshes with and is rotated by an idler gear 94 (see also Figs. 2a and 4) mounted on a short shaft 95 journaled in bearings formed in the bottom structure of the housing 25. The short shaft 95 also carries a pinion 97 which meshes with and is driven by the gear 45 which is part of the driving gear train hereinbefore mentioned. Through this gear connection the vibrator shaft 88 is rotated rapidly and its eccentrically located pin 91, bearinged in the ring table 82, thus vibrates the table. The ring table is loosely anchored on the support 86, at a point diametrically opposite the eccentric pin 91 by a stationary pin 98 (Figs. 11 and 12) which extends up from the support 86 and projects into a slot 99 formed in the ring table.

As the cans B are advanced along the shaker table 82 in spaced and timed order by the filling turret 73, the product A is weighed out into individual charges of a predetermined weight, and the charges are individually vacuumized before being filled into the moving cans. The product weighing operation is effected in the open air outside of the vacuum chamber D while the filling operation is effected within the chamber. The product prevacuumizing operation is brought about immediately prior to the introduction of the weighed charges of the product into the vacuum chamber D. These operations are effected in time with the travel of the cans and are performed by devices forming parts of the filling mechanism E. These parts rotate concentrically around the stationary column 71 and are supported principally on a centrally located vertical driving sleeve 101 (Fig. 2a) which is journaled in bearings 102 formed as integral extensions of column 71.

The lower reduced end of the filler driving sleeve 101 extends below the bottom of the housing 25 and carries the gear 45 which is a part of the driving gear train hereinbefore described. The gear 45 rotates the sleeve 101. The upper end of the sleeve extends above the bearing 102 and is provided with a flange 103 which supports a circular filler head spider or carrier member 104 (see also Fig. 3) which rotates with the sleeve. The carrier member 104 rotates in a cylindrical seat 105 formed in the housing 25 and thus provides a hermetic barrier between the outside air and the vacuumized interior of the chamber D. The top of the carrier member 104 supports an annular plate 107 which in turn supports a hollow pedestal 108. The plate 107 and the pedestal 108 are mounted concentric with the axis of the sleeve 101 and are secured together and to the sleeve so as to rotate as a unitary structure. The top of the pedestal 108 is secured to a hopper or reservoir 109 which rotates concentrically with the sleeve 101 and which contains the product A to be weighed into individual charges to be filled into the moving cans B within the vacuum chamber D.

The weighing of the product A into the individual charges for filling into the cans B is effected preferably by a plurality of weighing devices G (Figs. 2a, 7 and 8) which are located immediately below the hopper 109. There is one weighing device G for each pocket 74 of the filling turret 73 and each device is disposed in vertical alignment with its turret pocket. Each device G includes a product dispensing nozzle 112 which depends from the bottom of the hopper 109 and which communicates with an opening 113 in the bottom of the hopper. There is one opening 113 for each weighing device.

The lower end of the nozzle 112 is shaped as an inverted cone and its outwardly facing wall is formed with a dispensing slot 115 which is normally closed by a hinged trap door 116 as shown in Fig. 8. The upper end of the door 116 is mounted on a pivot pin 117 carried in lugs 118 formed on the nozzle.

This upper end of the door is also formed with an outwardly projecting arm 119 which carries a cam roller 121 disposed in a path of travel intersected by a short stationary cam 122 (see also Fig. 3) mounted on a post 123 extending up from the main housing 25. The cam 122 is located in a predetermined position relative to the travel of an empty can B advanced by the filling turret 73, preferably as near as possible to the entrance of the can into the turret, as shown in Fig. 3.

Engagement of the cam roller 121 with the cam 122 as the roller passes the cam, lifts the roller and thus rocks the arm 119 upwardly. This action swings the trap door 116 downwardly into an open position, as shown in Fig. 7. The door opens against the resistance of a spring 125 which is stretched between the door and a pin secured in the outer wall of the nozzle. In opening, the free lower edge of the door 116 slides along a locking finger 127 which is mounted on a pivot pin 128 carried in lugs 129 formed on the back of the nozzle 112. When the door is fully open it rides off of the finger and the finger snaps under the door as shown in Fig. 7 and holds it open after the cam roller 121 rides off of the cam 122.

The opening of the trap door 116 permits the granular product A in the hopper 109 to discharge from the open dispensing slot 115 of the nozzle 112. The discharging product flows into a weighing bucket 131 which is disposed directly below the nozzle 112 in vertical alignment therewith. There is one weighing bucket 131 for each nozzle for weighing out a charge of the product for filling into one of the empty vacuumized cans B in the filling turret 73. Each weighing bucket 131 is connected by a pair of pivot pins 132 (Figs. 7 and 8) to the outer bifurcated end of a weighing beam 133 balanced on a knife edge 134 supported on a bracket 135 secured to the plate 107. The inner end of the weighing beam 133 carries an adjustable weight 136 which is adjusted to compensate for the weight of the bucket 131 and to terminate the flow of the product from the nozzle 112 into the weighing bucket when a charge of a predetermined weight of the product has been received in the bucket.

Cutting off of the flow of the product into the weighing bucket 131 is effected preferably through a pair of links 138 disposed one on each side of the nozzle 112. These links have elongated slots 139 in their lower ends. The bucket pivot pins 132 are of sufficient length to extend into the slots in these links. The upper ends of the links are pivotally connected to a pair of arms 141 which are secured to the pivot pin 128 of the locking finger 127, the arms 141, the pin 128 and the finger 127 being secured together in a predetermined relation to act as a unitary structure. The slots 139 in the link 138 are of just sufficient length to permit the bucket pivot pin 132 to engage the links at the upper ends of the slots as shown in Fig. 7 to hold the locking finger 127 up, in locking position when the empty weighing bucket 131 is counterbalanced by the weight 136. The lower extremities of the slots are disposed so that the bucket pivot pin 132 will engage the links at the bottoms of the slots when the bucket 131 has received the full charge of the product and tilted the balance beam 133 as shown in Fig. 8.

Hence when a sufficient quantity of the product A has discharged from the nozzle 112 into the weighing bucket 131 so as to constitute a product charge of a predetermined weight, the product charge tilts the balance beam 133 and simultaneously draws down on the link 138. This pulling on the link, draws down on the arm 141 and thus swings the locking pin 127 away from the trap door 116 of the nozzle 112 (see Fig. 8). This releases the door 116 and the spring 125 thereupon snaps it shut, thereby cutting off any further flow of the product from the nozzle. This completes the weighing operation and the entire quantity of the product A received in the weighing bucket 131 constitutes the product charge to be filled into the cans B. This weighing operation takes place while the hopper 109, the attached nozzle 112 and the weighing bucket 131 are moving with the aligned cans B in the filling turret 73.

As soon as the product charge has been weighed out, it is immediately discharged from the weighing bucket 131 through the bottom of the bucket which is normally closed by a hinged bottom plate 144 (Figs. 7 and 8). The plate adjacent one edge is mounted on a pivot pin 145 carried in support lugs which extend out from the bucket. Adjacent the pivot pin, the bottom plate 144 is formed with a short arm 146, the outer end of which is connected to a vertically disposed piston rod 147. The rod 147 extends up into a cylinder 148 attached to the back of the weighing bucket. Within the cylinder the rod 147 carries a piston 149. A compression spring 151 interposed between the top of the piston 149 and the upper end wall of the cylinder 148 maintains a downward pressure on the piston and keeps the bottom plate 144 normally closed as shown in Fig. 7.

Swinging of the bottom plate 144 into open position, as shown in Fig. 8, to discharge the weighed charge of the product A from the bucket, preferably is effected by fluid pressure, such as a vacuum created in the cylinder 148 above the piston 149. For this purpose, the interior of the upper end of the cylinder 148 is connected by a flexible tube 153 (Fig. 7) to a radial bore 154 formed in the ring 107 which rotates with the vertical driving sleeve 101. There is one bore 154 in the ring 107 for each weighing bucket 131. The inner ends of these bores 154 are connected by pipes 156 (see also Fig. 2a) which extend down through the driving sleeve 101 to a rotatable valve head 157 secured to and rotating with the lower end of the sleeve. This valve head 157 is formed with a flat lower face which seats against and rotates on a similar flat face of a stationary valve head 158 (Fig. 2a) secured to the bottom structure of the vacuum chamber housing 25.

Figure 10:
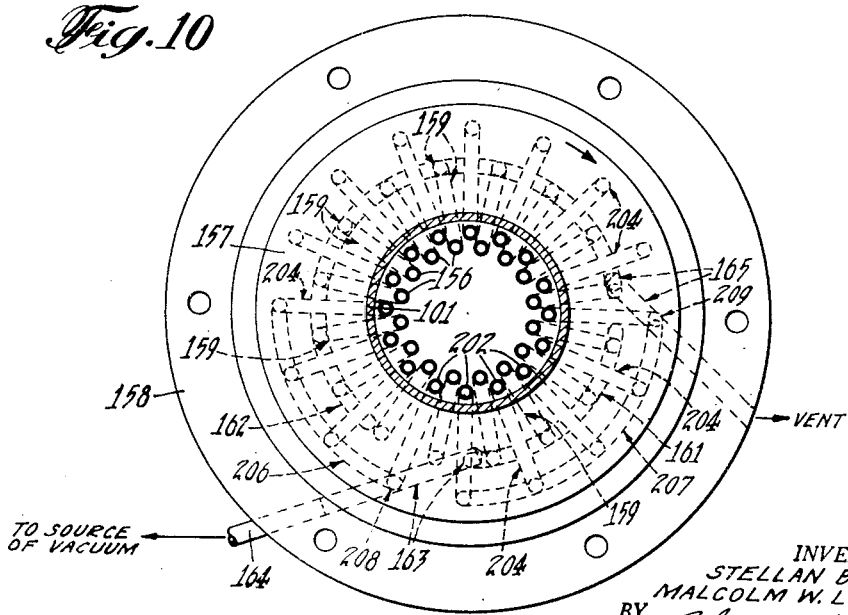

At the rotatable valve head 157, the lower ends of the pipes 156 terminate in communication with radial bores 159 formed in the head and extending out to the flat face of the head. The terminal ends of these bores 159 are arranged in a circle concentric with the axis of the sleeve 101 and are adapted to rotate into register with a short vacuumizing groove 161 (Fig. 10) and a long separate vent groove 162 formed in the flat face of the stationary valve head 158. The vacuumizing groove 161 is connected by continuing vertical and horizontal channels 163 in the stationary valve head, to a lead-in pipe 164 which leads from any suitable source of vacuum. The vent groove 162 is connected by similar continuing vertical and horizontal channels 165 in the stationary valve head which lead to the outside atmosphere.

Hence when a bore 159 of the rotating valve head 157 comes into register with the short vacuumizing groove 161 of the stationary valve head 158, a direct line of communication is established through the associated pipe 156 with the interior of the upper portion of the cylinder 148 and this creates a vacuum in the cylinder sufficient to move the piston 149 upwardly against the force of the spring 151. This upward movement of the piston opens the bottom plate 144 of the bucket 131 and permits the weighed charge of the product A to discharge from the bucket. By comparing the location of the vacuumizing groove 161 in Fig. 10 with the location of the entrance of the empty cans B into the filling turret as shown in Fig. 1, it will be noted that this discharge of the weighed product is effected before the cans enter the filling turret for the purpose of allowing sufficient time to prevacuumize the product before it enters the cans as will be hereinafter explained.

The bottom plate 144 of the weighing bucket 131 remains open a sufficient time to insure full discharge of the weighed product and then the bore 159 moves out of register with the vacuum groove 161 and moves into register with the vent groove 162. The bore 159 remains in register with this vent groove 162 for the remainder of the cycle of operation of the machine until the next vacuumizing operation is required. When the bore 159 comes into register with this vent groove 162, the interior of the upper portion of the cylinder 148 is vented to the outside atmosphere through the flexible tube 153, pipe 156, bore 159, groove 162, and the vent bores 165 in the stationary valve head 158. This breaks the vacuum in the cylinder and permits the spring 151 to close the bottom plate 144 of the bucket 131 for a subsequent weighing operation. A vent port 167 (Figs. 7 and 8) in the bottom of the cylinder 148 provides for venting the air from the cylinder during the downward movement of the piston.

The weighed charge of the product A upon being discharged from the weighing bucket 131 falls into a prevacuumizing and filling head 171 (Figs. 2a and 3) which is located directly under the bucket and in vertical alignment with the bucket and the empty can B in the filling turret 73. There is one of these prevacuumizing and filling heads 171 for each can pocket 74 of the filling turret 73 and they are carried in the rotating carrier member 104 in a circle concentric with the axis of the carrier member.

Each prevacuumizing and filling head 171 comprises a prevacuumizing bell 172 formed at its upper or entrance end with a cylindrical valve seat 173 for a lift valve 174. Above the seat 173 the bell is formed with a flaring hopper 175 to receive the weighed charge of the product A. The lift valve 174 is carried on the inner end of a horizontal lever 176 which projects through the side of the receiving hopper 175. Intermediate its ends the lever is mounted on a pivot pin secured in lugs on the side of the hopper. The outer end of the lever carries a cam roller 177, which during a portion of the cycle of operation of the machine engages under a stationary track 178 (see Figs. 3 and 2a) secured to the outside of the main housing 25. The location of this track and its length substantially coincides with the location and length of the vacuumizing groove 161 (Fig. 10) in the stationary valve head 158 so that the track will open the lift valve 174 at substantially the same time that the bottom plate 144 of the weighing bucket 131 is open so that the weighed charge of product will fall from the bucket, through the receiving hopper 175 and open lift valve 174 directly into the prevacuumizing bell 172.

Figure 9:
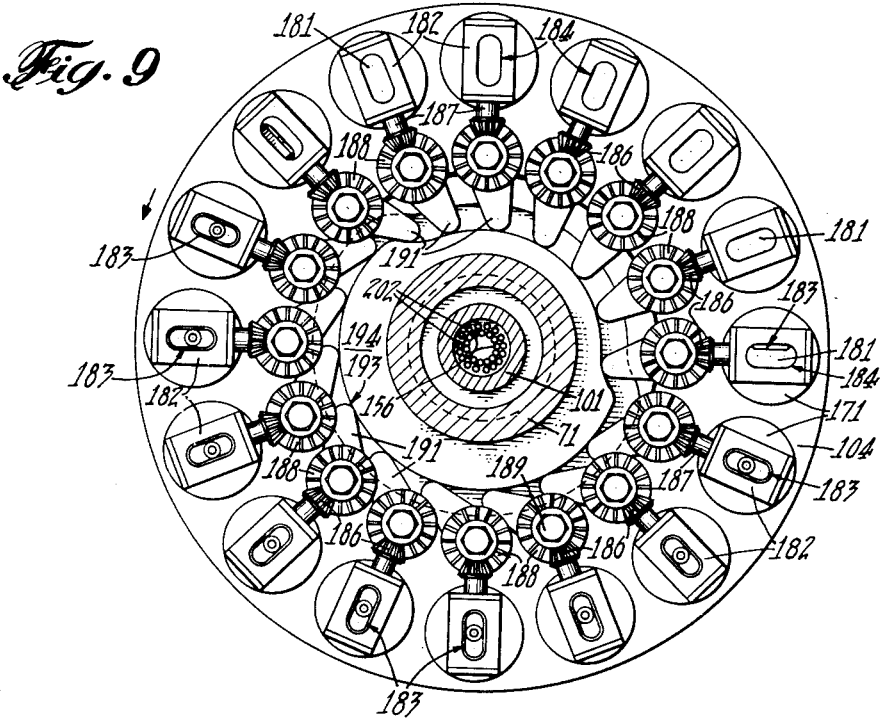
Fig. 9 is a plan view taken substantially along the line 9—9 in Fig. 2a, looking upwardly, and with parts omitted.

As soon as the charge of product is received in the prevacuumizing bell 172, the lift valve 174 closes against its seat 173 and thus hermetically seals the top of the bell against the entrance of outside air. The product charge is retained in the bell by a normally closed filling valve 181 (Figs. 2a and 9) which is located adjacent the bottom of the bell. The filling valve 181 is cylindrical in shape and is rotatably disposed in a horizontal position in a bearing 182 formed at the bottom of the prevacuumizing bell 172. The valve is provided with a transverse elongated dispensing opening 183 adapted to align simultaneously with the bottom of the prevacuumizing bell 172 and a port 184 in the bearing 182 when the valve is turned into open position to discharge the product from the bell into a can B to be filled. This valve normally is closed to prevent the entrance of air into the vacuum chamber D during the charging of the weighed product into the bell 172.

The filling valve 181 is rotated in its bearing 182 by a bevel gear 186 which is mounted on an axially projecting stem 187 of the valve. The gear meshes with a bevel gear 188 mounted on a stub shaft 189 threaded into the carrier member 104. The gear 188 is formed integrally with an arm 191 having a cam roller 192 which operates in a cam groove 193 of a stationary cam 194 carried on the upright column 71. The cam groove rocks the arms 191 as the carrier member 104 rotates relative to the stationary cam 194 and thus opens and closes the filling valves 181 at the proper time as will be more fully explained hereinafter.

While the product charge is in a prevacuumizing bell 172, with the top lift valve 174 and the filling valve 181 closed, the product and the interior of the bell are prevacuumized to exhaust any trapped air to prevent this air from entering the vacuum chamber D. This prevacuumizing operation is effected primarily to maintain a constant degree of vacuum within the vacuum chamber D. The prevacuumizing operation is effected at the proper time through a flexible tube 201 (Fig. 2a) which connects the interior of the prevacuumizing bell 172 adjacent its upper end with a radial bore 202 in the ring 107 supported on the carrier member 104 (see also Fig. 7). The inner end of the radial bore 202 is connected by a pipe 203 to continuing bores 204 in the rotary valve head 157 (see also Fig. 10).

There are a plurality of these bores 202, pipes 203, and bores 204, one set for each prevacuumizing bell 172 and they terminate at the flat face of the rotary valve head in a circle concentric with the axis of the driving sleeve 101. The terminal ends of the bores 204 are adapted to rotate into register with a vacuumizing groove 206 (Fig. 10) and a venting groove 207 formed in the flat face of the stationary valve head 158. The vacuumizing groove 206 communicates by way of a short bore 208 with the lead-in pipe 164 and is thus exhausted of air by the source of vacuum connecting with the pipe. In a similar manner the venting groove 207, through a connecting bore 209 is in communication with the vent bore 165.

Hence, as soon as the lift valve 174 of a prevacuumizing bell 172 closes and seals the weighed charge of the product A in the bell, the associated bore 204 in the rotary valve head 157 comes into register with the vacuumizing groove 206 in the stationary valve head 158, and establishes communication through the pipe 203, ring bore 202, and flexible tube 201, between the prevacuumizing bell 172 and the source of vacuum. A vacuum is thus drawn on the bell and the individual product charge therein and thus any trapped air is removed from the bell and the product. This prevacuumizing operation continues for approximately 60 degrees of rotation of the carrier member 104, as measured by the length of the vacuumizing groove 206 in Fig. 10, and then the bore 204 rotates out of register with the vacuumizing groove and thus cuts off the source of vacuum.

With the product charge and the bell 172 prevacuumized, the charge is ready for filling into the empty vacuumized can B in a pocket 74 of the filling turret 73. The closed filling valve 181 at the bottom of the prevacuumizing and filling head 171 is now rotated by the cam groove 193, into open position as shown at the left in Fig. 2a, as hereinbefore explained. This permits the individually weighed and individually vacuumized product charge to flow from the bell 172 into the waiting and vibrating can B. To insure that all of the weighed charge of the product is discharged into the can B, the filling operation takes place over nearly 180° of rotation of the carrier member 104. Upon completing this cycle, the filling valve 181 closes to preserve the vacuum condition in the vacuum chamber D and then the vacuum within the bell 172 is broken by virtue of its associated bore 204 coming into register with the venting groove 207 in the stationary valve head 158. The lift valve 174 is thereupon opened to receive a subsequent product charge for another can B.

As soon as the filling valve 181 closes, and while the filled can B with its product charge remains in the vacuum chamber D, the can is removed from its pocket 74 in the filling turret 73 and is advanced to meet a cover C in readiness for closing. Removal of the filled can B from the turret is effected by a transfer device J of the character disclosed in United States Patent 2,298,306 issued October 13, 1942 to R. E. J. Nordquist on Vacuum Can Closing Machine. Such a transfer device comprises a plurality of half moulds 212 (Fig. 1) pivotally connected to a rotatable disc 213 at spaced intervals adjacent the periphery of the disc. The moulds are secured to cam actuated arms 214 which accelerate and decelerate the moulds to pick up a filled can B and deliver it into the closing machine F in time with the operation of the latter machine. The disc 213 is mounted on a vertical shaft 215 (see also Fig. 4) which is rotated in time with the other moving parts of the machine by a gear 216 which meshes with the gear 48 of the main driving gear train hereinbefore mentioned.

The moulds 212 pass adjacent the path of travel of the cans in the filling turret 73 in time with this turret and engage around a can to be transferred as shown in Fig. 1. As the mould advances with the can, the can engages and is swept out of its turret pocket 74 by a curved guide rail 217 which is disposed adjacent the outer periphery of the disc 213 and which retains the can in its mould. The mould thereafter sweeps the can off the shaker table 82 onto and along a short support table 218 which leads to the closing machine F.

As the advancing filled can B approaches the closing machine F, a cover C is advanced into position on top of the can for attachment thereto. This is brought about by a cover feed mechanism K (Figs. 1, 13 and 14) which is dispose adjacent the transfer device J partially within the vacuum chamber D and partially outside the chamber.

The covers C are received from any suitable source of supply outside the chamber D and in an upside down position resting on their flanges so that the inside of the cover, if coated, will not be scratched. They are fed in spaced and timed order in a substantially continuous procession along a runway 221 comprising a pair of spaced and parallel guide rails 222 secured to the outside of the housing 25. The covers are advanced by a reciprocating stroke bar 223 having spring pressed feed dogs 224. The stroke bar operates in a slideway 225 formed in the base of the runway and is reciprocated in any suitable manner in time with the other moving parts of the machine.

The cover runway 221 terminates adjacent an entrance opening 227 formed in the vacuum chamber housing 25 and through which the covers C are passed into the chamber D by the stroke bar 223. Within the vacuum chamber D the entrance opening 227 is shielded by an intermittently rotatable valve 231 (Figs. 13 and 14) disposed in a close fitting cylindrical seat 232 formed in a valve casing 233 secured to the inside of the housing 25 around the entrance opening 227. The valve casing 233 is provided with an opening 234 which aligns with the entrance opening 227 in the housing for passage of a cover into the valve.

Figure 13:
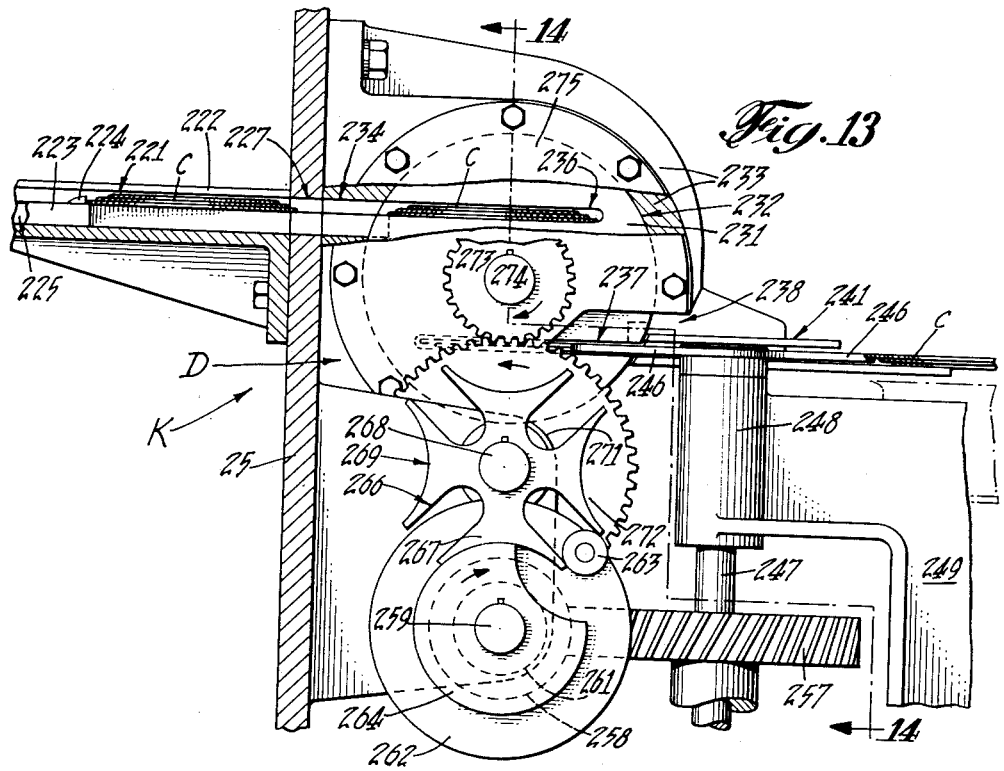
Fig. 13 is an enlarged sectional detail taken substantially along the broken line 13—13 in Fig. 1, with parts broken away.
Figure 14:
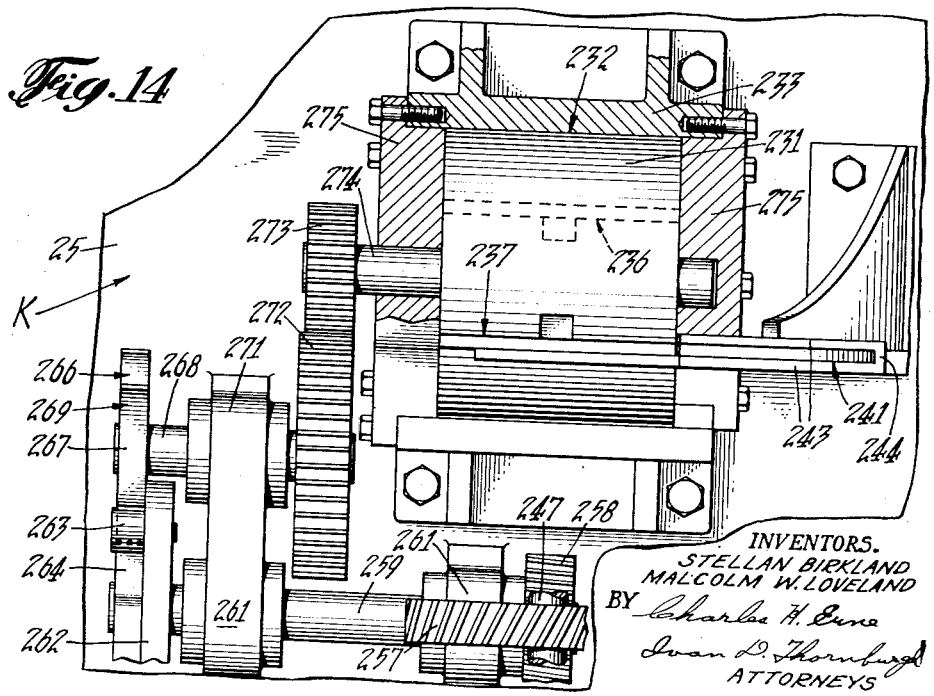
Fig. 14 is a sectional view taken substantially along the broken line 14—14 in Fig. 13, with parts broken away.

A cover C passed through these openings 227, 234 is received in the uppermost of a pair of spaced and parallel horizontal slots 236, 237 formed in the valve in an off set location relative to the axis of the valve, one above and one below the axis of the valve as shown in Figs. 13 and 14. These slots extend from the outer periphery of the valve inwardly a distance slightly greater than the diameter of the cover, and in width extend from one side of the valve to the other. The slots are slightly thicker than the thickness of a cover so as to eliminate any excess looseness of the cover in the slots.

When a cover C is received in the upper slot 236, the valve 231 is rotated through an arc of 180°. This rotation of the valve swings the upper slot 236 and its cover C upwardly and thence downwardly into the position of the lower slot 237 as viewed in Fig. 13 while blocking the entrance openings 227, 234 to prevent entrance of outside air into the chamber, and simultaneously turns the cover right side up into proper position for application to the can B. The cover C is now adjacent an opening 238 in the valve casing 233 and this opening is in communication with the vacuum chamber D. In this manner the cover is introduced into the chamber without admitting an appreciable amount of air into the chamber. The slot 237 in the valve is also in position adjacent the housing opening 227 and the casing opening 234 for the reception of another cover C.

While the valve 231 is at rest between its intermittent rotations, the cover C introduced into the vacuum chamber D is swept laterally out of its slot 236 (now in the position of the lower slot 237) and advanced along a curved guide rail 241 (Figs. 1, 13 and 14) which extends from the valve 231 toward the path of travel of the filled cans B being advanced by the transfer moulds 212. The guide rails terminate adjacent the outer ends of the moulds, overlapping the path of travel of the cans and in horizontal alignment with a cover seat or ledge 242 formed in the moulds above and concentric with the cans in the moulds. The guide rail 241 is provided with a pair of broad horizontally spaced and parallel upper and lower confining and supporting walls 243 connected by an outer curved guide wall 244, the space between the horizontal walls 243 being only slightly greater than the thickness of the cover to fully support and confine the cover.

A cover thus swept out of its valve slot 236 and along the guide rail 241 is moved toward an advancing filled can B in a transfer mould 212 and is deposited in the mould on its cover seat 242 in a position slightly above and in vertical alignment with the filled can. This advancement of the cover preferably is effected by a double end, horizontal transfer finger 246 which is disposed in a plane which coincides with the lower slot position of the cover valve 231 and with the space between the horizontal walls 243 of the guide rail 241. This finger 246 intermediate its ends is mounted on a continuously rotating shaft 247 journaled in a bearing 248 formed in a bracket 249 which extends up from the bottom of the vacuum housing 25.

The rotation of the transfer finger 246 is effected in timed relation with the intermittent rotation of the valve 231 so that the finger will pass through the slots 236, 237 when they are in the lower slot position, and both of these are rotated in timed relation with the advancement of the transfer moulds 212 so that a cover will be properly superimposed upon a filled can. For this purpose the transfer finger 246 and the valve 231 are driven from the transfer mould driving gear 216 (Fig. 4) which in turn is driven from the gear 48 of the main driving gear train located in the bottom structure of the housing 25. The gear 216 meshes with and drives a pair of meshing pinions 251, 252 (Fig. 4) carried on vertical shafts 253, 254 journaled in suitable bearings secured to the housing 25. The pinion 252 meshes with and drives a gear 255 carried on the transfer finger shaft 247 and it is this gear that rotates the finger 246.

The cover valve 231 is intermittently rotated by a helical gear 257 (Figs. 4, 13 and 14) which is carried on the vertically disposed transfer finger shaft 247. The helical gear 257 meshes with and drives a second helical gear 258 mounted on a short horizontally disposed Geneva actuating shaft 259 journaled in a pair of spaced bearings 261 projected from the inside of the housing 25. One end of the Geneva actuating shaft 259 carries a disc 262 having secured thereto a Geneva actuating roller 263 and a Geneva locking member 264. As the disc 262 rotates continuously, the roller 263 engages in spaced radial slots 266 of a conventional Geneva wheel 267 mounted on a horizontal Geneva shaft 268 to rotate the shaft intermittently. The usual locking recesses 269 formed in the Geneva wheel co-operate with the locking member 264 in the conventional manner to hold the Geneva wheel stationary between its intermittent partial rotations.

The Geneva shaft 268 is journaled in a bearing 271 which extends out from the main housing 25. Beyond the bearing the shaft 268 carries a gear 272 which meshes with a pinion 273 mounted on one end of a valve shaft 274 which extends through the axis of the cover valve 231 and on which the valve rotates. The valve shaft 274 is journaled in bearings formed in end plates 275 of the valve casing 233. It is through this train of gears and the Geneva mechanism explained above that the cover valve 231 and the transfer finger 246 are operated in timed order to introduce a cover C into the vacuum chamber D and to advance it into superimposed position on a filled can B.

The can B after receiving its cover C continues to advance toward the closing mechanism F. During this travel, a curved guide rail 277 (Fig. 1) holds the cover C in place in its seat 242 in its mould 212. Upon approaching the closing mechanism F, the mould 212 deposits the can B and its cover C into respective vertically aligned pockets 281, 282 (Fig. 2b) of a rotating turret 283 of the closing mechanism.

The closing mechanism F is a conventional mechanism of the character disclosed in United States Patent 2,039,338 issued May 5, 1936 to R. E. J. Nordquist et al. on Vacuum Closing Machine. In the instant invention the entire closing mechanism F is disposed within the vacuum chamber D so that the closing of the cans B is effected in the same vacuum in which the empty cans B and the covers C are introduced for vacuumizing, filling and assembling.

In such a closing mechanism F, the can and cover turret 283 is carried on a vertically disposed rotatable sleeve structure 284 (Fig. 2b) which is journaled in a lower bearing 285 in the bottom of the housing 25 and an upper bearing 286 secured in the top of the housing 25. This sleeve structure 284 is rotated continuously by a gear 287 which meshes with the pinion 49 of the main driving gear train at the bottom of the housing 25. Besides the turret 283, the sleeve structure 284 carries a lifter disc 288 having conventional lifter pads 289 and a gear casing 291 having conventional rotatable closing heads 292 equipped with chucks 293 and seaming rollers 294. All these members rotate with the sleeve structure, the seaming heads 292 being located above and in vertical alignment with the pockets 231 in the turret 283 and the lifter pads 289 being located below and in vertical alignment with the pockets. The lifter pads are raised and lowered by cam rollers 296 which ride on a stationary cam track 297 secured to the bottom of the housing 25.

The seaming heads 292 are rotated on their own axes by differential gears 301, 302 which mesh with driving gears 303, 304 mounted on the upper end of a vertical drive shaft 305 which is disposed within the sleeve structure 284. At its lower end the drive shaft 305 carries the bevel gear 52 which is the main driving gear of the machine as hereinbefore mentioned.

Hence when a can B and its superimposed cover C are introduced into the pockets 281, 282 of the turret 283 of the closing mechanism, the can rides off of the table 218 of the transfer device and moves into position on a lifter pad 289 of the closing mechanism. The turret 283 and the lifter pad 289 pick up the can and its cover as the turret and pad rotate through a curved path of travel with the sleeve structure 284. Along this path of travel, the lifter pad 289 lifts the can up into engagement with its cover and then continues to lift both the can and its cover up into the seaming head 292. The chuck 293 of the head clamps the cover on the can and the seaming rollers rotate around the edge of the clamped cover an permanently seam it fast to the can. The lifter thereupon lowers the closed and sealed can to its original level for discharge from the closing mechanism. This is a conventional can closing operation as practiced in the machine disclosed in the above mentioned Nordquist Patent 2,039,338 and many other closing machines.

Discharge of the sealed can B from the closing mechanism F preferably is effected by a multipronged star wheel 308 (Figs. 1 and 2b) which is disposed adjacent the path of travel of the cans in the closing mechanism turret 283. The star wheel 308 is mounted on the upper end of a vertical shaft 309 (see also Fig. 4) driven by a gear 311 which meshes with and is driven by the closing mechanism sleeve gear 287. Thus the star wheel is driven in time with the turret 283. The rotating star wheel 308 engages a sealed can B ready to be discharged from the turret 283 and in co-operation with a set of guide rails 312 between which the can passes, removes the can from its turret pocket 231.

After removal of the can from its turret pocket, the star wheel propels the can along the guide rails 312 toward an exit valve 315. There preferably are four guide rails 312 and they are twisted in such a manner, as best shown in Fig. 1, as to rotate or turn the can as it advances along the rails, from a vertical or upright position into a horizontal position so the can may roll on its side out of the machine. The guide rails 312 terminate adjacent the exit valve 315.

The exit valve 315 is a cylindrical valve having spaced peripheral pockets 316 (Fig. 2b) adapted to receive a sealed can B. The valve is mounted on a continuously rotating shaft 317 and rotates in a cylindrical seat 318 formed in a valve housing block 319 as a part of the housing 25. The shaft is rotated by a bevel gear 321 (Fig. 1) which is carried on the shaft and which meshes with a similar bevel gear 322 carried on the upper end of a vertical shaft 323. At its lower end the shaft 323 carries a gear 324 (see Figs. 2b and 4) which meshes with and is driven by the star wheel driving gear 311.

The valve block 319 at its upper end adjacent the terminal ends of the guide rails 312 is formed with a can entrance opening 326 for the transfer of a closed can B from the guide rails 321 into a pocket 316 of the rotating valve 315. A can so received in a valve pocket 316 is carried by the valve toward the bottom of the valve block 319 and discharged from the pocket through an exit opening 327 in the bottom of the block. Thus the closed can is discharged from the machine without admitting any appreciable amount of air into the vacuum chamber D. The discharged can B falls into a discharge runway 328 (Fig. 2b) disposed adjacent the block exit opening 327 and which directs the closed can to any suitable place of deposit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for weighing out individual charges of a product and for filling and sealing them in cans, the combination of a housing enclosing a vacuumized chamber for receiving and vacuumizing an empty can to be filled with a said charge, a weighing device carried by said housing on the exterior of said chamber for weighing out an individual product charge of a weight predetermined by the capacity of a said can, a product prevacuumizing and filling head disposed partially within and partially outside of said chamber adjacent said weighing device for receiving an individual weighed charge of the product discharged therefrom, a lift valve in the portion of said head outside of said chamber for sealing said individual product charge in said head to exclude outside air from said head and from said chamber, cam means for actuating said lift valve, means communicating with said head for prevacuumizing the product charge sealed in said head, valve means for controlling the prevacuumizing of said product charge in said head, a rotary valve in the portion of said head within said chamber for discharging the prevacuumized product charge into the can within said chamber, cam means for actuating said rotary valve, and actuating means for effecting relative movement in timed relation of said first mentioned cam means and said lift valve, said valve means and said head, and said second mentioned cam means and said rotary valve, whereby to effect the opening and closing of said valves and the prevacuumizing of said product charge in said head in proper synchronized sequence.

2. In a machine for weighing out individual charges of a product and for filling and sealing them in cans, the combination of a housing enclosing a vacuumized chamber for receiving and vacuumizing empty cans to be filled with a said charge, said housing having a circular opening surrounded by a seat, a rotatable carrier member disposed within said seat for hermetically sealing said chamber, means for rotating said carrier member in its seat, a weighing device carried by and disposed above said carrier member outside of said chamber for weighing out an individual product charge of a weight predetermined by the capacity of a said can, a prevacuumizing and filling head mounted in said carrier member and disposed partially within and partially outside of said chamber between the latter and said weighing device for receiving an individual weighed product charge therefrom, means for sealing said individual product charge in said head to exclude outside air from said head and from said chamber, means communicating with said head for prevacuumizing the product charge while sealed in said head, means in said head for discharging the prevacuumized product charge from said head into a can within said chamber, means for advancing the can within said chamber through a circular path of travel in vertical alignment with said head, a circular horizontal table having peripheral guide rails disposed within said chamber for supporting and guiding the advancing can, a supporting base for said table, eccentric means connected with said table for vibrating the table on its base in an eccentric motion to shake the can during the filling operation, and means for loosely anchoring said table to its base to permit vibration of the table.

3. In a machine for weighing out individual charges of a product and for filling and sealing them in cans, the combination of a rotatable carrier member, means for rotating said member, a weighing device mounted on said member for rotation therewith for weighing out an individual product charge of a weight predetermined by the capacity of a said can, rotatable means for advancing a can along a circular path of travel in subjacent vertical alignment with said weighing device, means rotatable in unison with said carrier member and disposed between said can advancing means and said weighing device for receiving said weighed product charge therefrom, a circular horizontal ring table having peripheral guide rails thereon disposed adjacent said can advancing means for supporting and guiding the advancing can, a supporting base for said table, eccentric means connected with said table for vibrating said table on its base in an eccentric motion to shake the can during the filling operation, and means for loosely anchoring said table to its base to permit vibration of the table.

4. In a machine for weighing out individual charges of a product and for filling and sealing them in cans, the combination of a housing enclosing a vacuumized chamber for receiving and vacuumizing an empty can to be filled and sealed, said housing having spaced entrance openings protected by movable valves for separately introducing the can and its cover into said chamber, said housing also having a discharge opening protected by a valve for discharging the sealed can and cover from said chamber without impairment of the degree of vacuum maintained in said chamber, a weighing device supported by said housing exteriorly of said chamber for weighing out an individual product charge of a weight predetermined by the capacity of a said can, means disposed between said weighing device and said chamber for receiving said weighed individual product charge from said weighing device, said receiving means having means cooperating therewith for prevacuumizing the received charge therein and for maintaining such charge in vacuumized condition, valve means on said receiving means for introducing said prevacuumized product charge into said chamber and into the can in said chamber, means in said chamber for receiving the filled can and a cover and for sealing the can with the cover, and conveyor means within said chamber for advancing the can and the cover through the chamber for the charge receiving and can filling, sealing and discharge operations.

5. In a machine for weighing out individual charges of a product and for filling and sealing said product charges in cans, the combination of a housing enclosing a vacuumized chamber for receiving and exhausting air from an empty can received therein to be filled with a said product charge, a weighing device supported exteriorly of said housing and chamber for weighing out an individual product charge of a weight commensurate with the volumetric capacity of said can, a valve controlled filling head carried by said housing beneath said weighing device for receiving at its outer open end said weighed charge from said weighing device, the inner end of said filling head communicating with the interior of said chamber, said filling head having means communicating therewith for prevacuumizing said head and charge and having valve means thereon for maintaining said head and product charge in a vacuumized condition, and valve means on the inner open end of said filling head for discharging said prevacuumized product charge therefrom directly into a vacuumized can within said chamber for subsequent sealing of the can therein.

6. In a machine for weighing out an individual charge of a product and for filling and sealing said charge in a can, the combination of a housing enclosing a vacuumized chamber for receiving and exhausting air from an empty can therein to be filled with said weighed charge, a weighing device supported by said housing on the exterior of said chamber for weighing out an individual product charge in accordance with the capacity of said can, a product pre-vacuumizing and filling head disposed beneath said weighing device and open at its upper end for receiving therefrom an individual weighed charge of the product, means for sealing said individual product charge in said head to exclude outside air from the head and from said chamber, said filling head communicating at its lower end with the interior of said chamber, means communicating with said head for prevacuumizing the product charge therein while sealed in said head, and valve means in said head for controlling the discharge of the pre-vacuumized product charge directly into the vacuumized can within said chamber without disturbing the vacuumized chamber conditions.

7. In a machine for weighing out individual charges of a product and for filling and sealing said charges in cans, the combination of a housing enclosing a vacuumized chamber for receiving and vacuumizing an empty can to be filled with a said product charge, a weighing device carried by said housing exteriorly of said chamber for weighing out an individual product charge in accordance with the capacity of said can, a prevacuumizing and filling head disposed beneath said weighing device and communicating at its lower end with said chamber, said head including a prevacuumizing bell for directly receiving an individual weighed product charge from said weighing device, valve means in said head for sealing the received weighed product charge in said bell to exclude outside air therefrom, vacuumizing means communicating with the interior of said bell for prevacuumizing the received individual product charge independently of the vacuumized condition maintained within said chamber, and other valve means in said filling head for controlling the introduction of said prevacuumized individual product charge into said independently vacuumized chamber and directly into a can therein for subsequent sealing of the can thus filled.

8. In a machine for weighing out individual charges of a product and for filling and sealing said charges in cans, the combination of a housing enclosing a vacuum chamber for receiving and vacuumizing an empty can to be filled with a said charge, said housing having an opening therein, means communicating with said chamber for maintaining it in a vacuumized condition, a carrier member movably disposed within said opening for hermetically sealing said chamber, a conveyor within said chamber for advancing the empty can therethrough, means for moving said carrier member in sealed relation to said opening and for moving said conveyor in timed relation to said carrier member, a weighing device mounted on and movable with said carrier member exteriorly of said chamber for weighing out an individual product charge in accordance with the capacity of a said can for receiving such charge, a combined product prevacuumizing and filling head carried by said carrier member beneath said weighing device, said head being disposed in superposed relation to a moving can on said conveyor, said head being disposed in sealed relation to said chamber and being open at its upper end for receiving an individual weighed charge of the product from said weighing device, the lower end of said head communicating with the interior of said chamber, means for sealing said individual product charge in said head to exclude outside air therefrom and from said chamber, means communicating with said head for prevacuumizing the product charge while sealed in said head, and valve means in said head for controlling the discharge of the prevacuumized product therefrom directly into the moving vacuumized can within said vacuumized chamber.

9. In a machine for weighing out individual charges of a product and for filling and sealing them in cans, the combination of a housing enclosing a vacuumized chamber for receiving and vacuumizing empty cans to be filled with a said charge, said housing having a circular opening surrounded by a seat, a rotatable carrier member disposed within said seat for hermetically sealing said chamber, a rotatable turret having peripheral pockets disposed within said chamber in axial alignment with said carrier member for receiving and advancing the cans in said chamber, means for rotating said carrier member and said turret in unison, a plurality of weighing devices supported by and rotatable with said carrier member on the exterior of said chamber, said weighing devices being respectively disposed in vertically spaced relation to said turret pockets for weighing out individual product charges in accordance with the capacity of a said can, a plurality of product prevacuumizing and filling heads movable with said carrier member and respectively disposed between said weighing devices and said turret pockets, said heads being open at their upper ends for directly and respectively receiving weighed charges of the product from said weighing devices, said filling heads communicating at their lower ends with the interior of said vacuumized chamber, means for sealing said individual product charges in said heads to exclude outside air therefrom and from said chamber, means communicating with each of said heads for prevacuumizing the product charges while sealed in said heads, and valve means in said heads for controlling the gravity discharge of the prevacuumized product charges therefrom directly into the pocketed and vacuumized cans within said vacuumized chamber.

References Cited in the file of this patent
UNITED STATES PATENTS

| Number | Name | Date |
| --- | --- | --- |
| 2,138,356 | Ryan et al. | Nov. 29, 1938 |
| 2,353,519 | Spurr | July 19, 1944 |